United States Patent [19]

Boccadoro et al.

[11] Patent Number: 4,552,109

[45] Date of Patent: Nov. 12, 1985

[54] PROCESS FOR STABILIZING THE IDLE SPEED OF AN INTERNAL COMBUSTION ENGINE WITH CONTROLLED IGNITION

[75] Inventors: Yves Boccadoro, Feucherolles; Paul Chastagner, Les Clayes sous Bois, both of France

[73] Assignee: Regie Nationale des Usines Renault, Boulogne-Billancourt, France

[21] Appl. No.: 567,000

[22] Filed: Dec. 30, 1983

[30] Foreign Application Priority Data

Dec. 30, 1982 [FR] France .................. 82 22146

[51] Int. Cl.[4] .............................. F02P 5/04
[52] U.S. Cl. .................... 123/339; 123/418; 123/417
[58] Field of Search ................ 123/339, 418, 416, 417

[56] References Cited

U.S. PATENT DOCUMENTS

| 4,328,775 | 5/1982 | Ironside | 123/339 |
| 4,338,899 | 7/1982 | Geiger et al. | 123/418 |
| 4,377,998 | 3/1983 | Hartel et al. | 123/418 |
| 4,399,789 | 8/1983 | Yano | 123/417 |
| 4,429,671 | 2/1984 | Surace | 123/418 |

FOREIGN PATENT DOCUMENTS

| 2221354 | 11/1973 | Fed. Rep. of Germany | 123/339 |
| 0013841 | 2/1979 | Japan | 123/418 |
| 0106737 | 8/1979 | Japan | 123/418 |

Primary Examiner—Parshotam S. Lall
Attorney, Agent, or Firm—Oblon, Fisher, Spivak, McClelland & Maier

[57] ABSTRACT

A process for stabilizing the idle speed of an internal combustion engine with controlled ignition, wherein the angle of ignition advance to be generated is determined as a function of the rotation speed of the engine and of the pressure prevailing in the intake manifold and, at each cycle for determining the angle of ignition advance, it is determined if the engine is in no-load operation and, if so, there is determined a corrective term of dynamic advance proportional to the instantaneous speed of the engine seen through a high-pass filter (N*) and there is generated an angle of ignition advance (Av) equal to the algebraic sum of a static advance (Avs) determined as a function of the engine speed after low-pass filtering and the intake manifold pressure, on the one hand, and of the corrective term (C), on the other hand.

10 Claims, 7 Drawing Figures

FIG_5

PROCESS FOR STABILIZING THE IDLE SPEED OF AN INTERNAL COMBUSTION ENGINE WITH CONTROLLED IGNITION

BACKGROUND OF THE INVENTION

1. Field of the Invention

This invention relates to a process for stabilizing the idle speed of an internal combustion engine with controlled ignition for a motor vehicle.

2. Description of the Prior Art

It is known how to regulate the idling speed of an internal combustion engine by keeping it the idling speed as close as possible to a predetermined value and by bringing it back to the predetermine value quickly when it deviates therefrom under the influence of an outside disturbance (variation of richness, advance, letting up on the accelerator, pulling of the power steering, etc.). For this purpose, appropriate means are used to affect the amount of air admitted into the intake manifold, as described, for example, in French patent application No. 8215193.

However, at idling, this type of engine exhibits a pumping phenomena due to poor combustion that is reflected by sudden significant variations of the idling speed. The constraints associated with the measures taken to combat pollution and promote energy savings have further aggravated this problem by calling for operating richnesses close to the equivalence ratio which give rise to disturbing phenomena (divergence from the flame propagation speeds, gaps in richness due to oxygen probes, etc.).

As a result, there can result engine speed oscillations of such a large amplitude that a regulation of idling speed by automatic control at a predetermined speed is not able to eliminate oscillations.

On the other hand, it is known how to make the angle of ignition advance tend to stabilize the idling speed and to eliminate the above noted oscillations. FIG. 1 shows a standard law of ignition advance as a function of the speed according to which the advance is constant over the evolution range of the idling speed. An improvement represented in FIG. 2 consists in providing a law of advance having a negative slope on the evolution range of the idling speed, any increase of the idling speed tending to be compensated by a decrease in the advance. However, at a speed slightly greater than that of the nominal idle (increased idling when cold, for example), there is a highly destabilizing positive advance slope since the variations of speed tend to be amplified.

SUMMARY OF THE INVENTION

Accordingly, one object of this invention is to provide a novel process for stabilizing the idle speed of an internal combustion engine with controlled ignition which is based on a manipulation of the angle of ignition advance, but which avoids the serious drawbacks of the above-mentioned methods and the necessity of referring to an instruction speed.

These and other objects are achieved according to this invention by providing a process for stabilizing the idle speed of an internal combustion engine with controlled ignition, wherein there is determined the angle engine ignition advance to be generated as a function of operating parameters including rotation speed and the pressure prevailing in the intake manifold. According to the method of the invention at each cycle for determining the angle of ignition advance, it is determined if the engine is in idle operation, and if so, a corrective term of dynamic advance is determined proportional to the instantaneous speed of the engine seen through a high-pass filter ($N^*$). An angle of ignition advance (Av) then produced equal to the algebraic sum of the corrective term (C) and a static advance (Avs) determined as a function of the operating parameters of the engine including its rotation speed and the pressure prevailing in the intake manifold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The stabilization of the rotation speed, according to this invention, acts to attenuate the instabilities and pumpings of the no-load engine as far as possible and must be distinguished from a regulation of idling speed which regulates the average speed with reference to a predetermined value.

Figure 1:
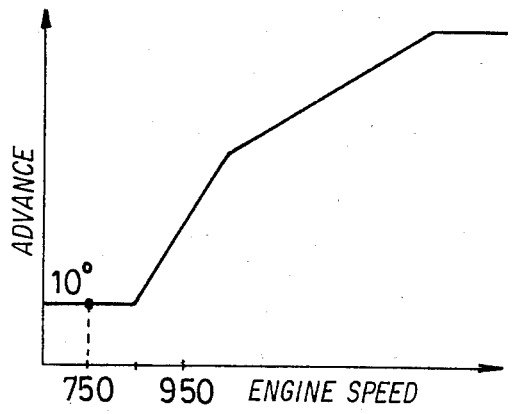
FIG. 1 is a graph showing a standard law of ignition advance as a function of the speed for an engine having controlled ignition.
Figure 2:
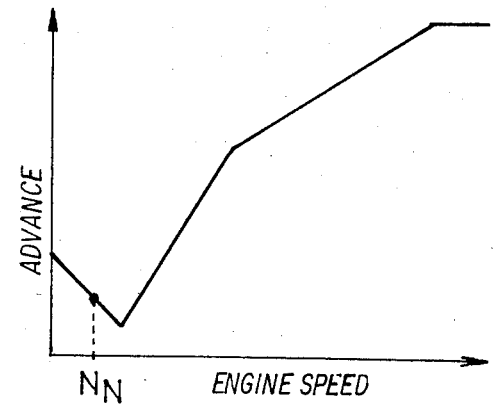
FIG. 2 is a graph similar to that of FIG. 1 illustrating a solution of the prior art for stabilizing the idling speed.
Figure 3:
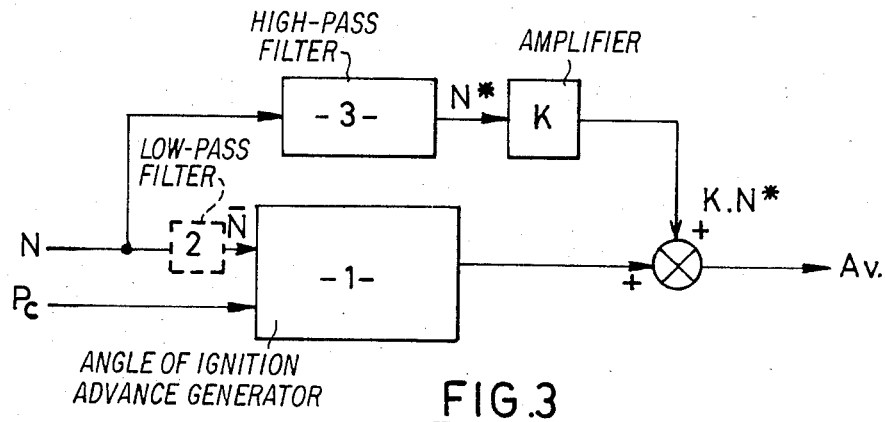
FIG. 3 is a functional diagram illustrating the stabilization process according to the invention.

Referring now to the drawings, wherein like reference numerals designate identical or corresponding parts throughout the several views, and more particularly to FIG. 3 thereof, consisting of the pressure Pc in the intake manifold of the engine and the rotation speed N of the engine, optionally filtered in a low-pass filter 2 producing a component $\overline{N}$ of the engine speed. Block 1 produces at its output a signal Avs representing the static speed generated as a function of Pc and N (or $\overline{N}$).

Speed signal N is also filtered by a high-pass filter 3 whose output $N^*$ and amplified by the amplifier 4 having a gain K. The amplified signal $N^*$ is added algebraically to the advance Avs. The system therefore produces at its output an advance $Av = Avs + K \cdot N^*$ sum of the "static" advance Avs and a "dynamic" advance $K \cdot N^*$.

Figure 4:
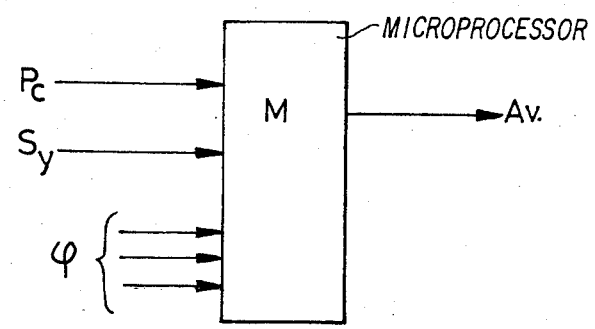
FIG. 4 is a block diagram illustrating the inputs/outputs of a microprocessor for the use of the stabilization process in the case of a digital ignition.

FIG. 4 shows a microprocessor M which makes it possible to use the process of the invention. Microprocessor M receives at one of its inputs the data PC indicative of pressure the intake manifold and at another of its inputs a synchronization signal Sy from which it computes the instantaneous rotation speed of the engine and which enables it to identify the passage of each cylinder by a predetermined position, for example the top dead center (TDC). From the speed and pressure data, the microcomputer M can address tables of stored values and compute the angle of ignition advance Av according to any suitable standard algorithm. This system for generating the angle of ignition advance is completely standard and French application No. 8213996 which gives an embodiment of it can be consulted.

Figure 5:
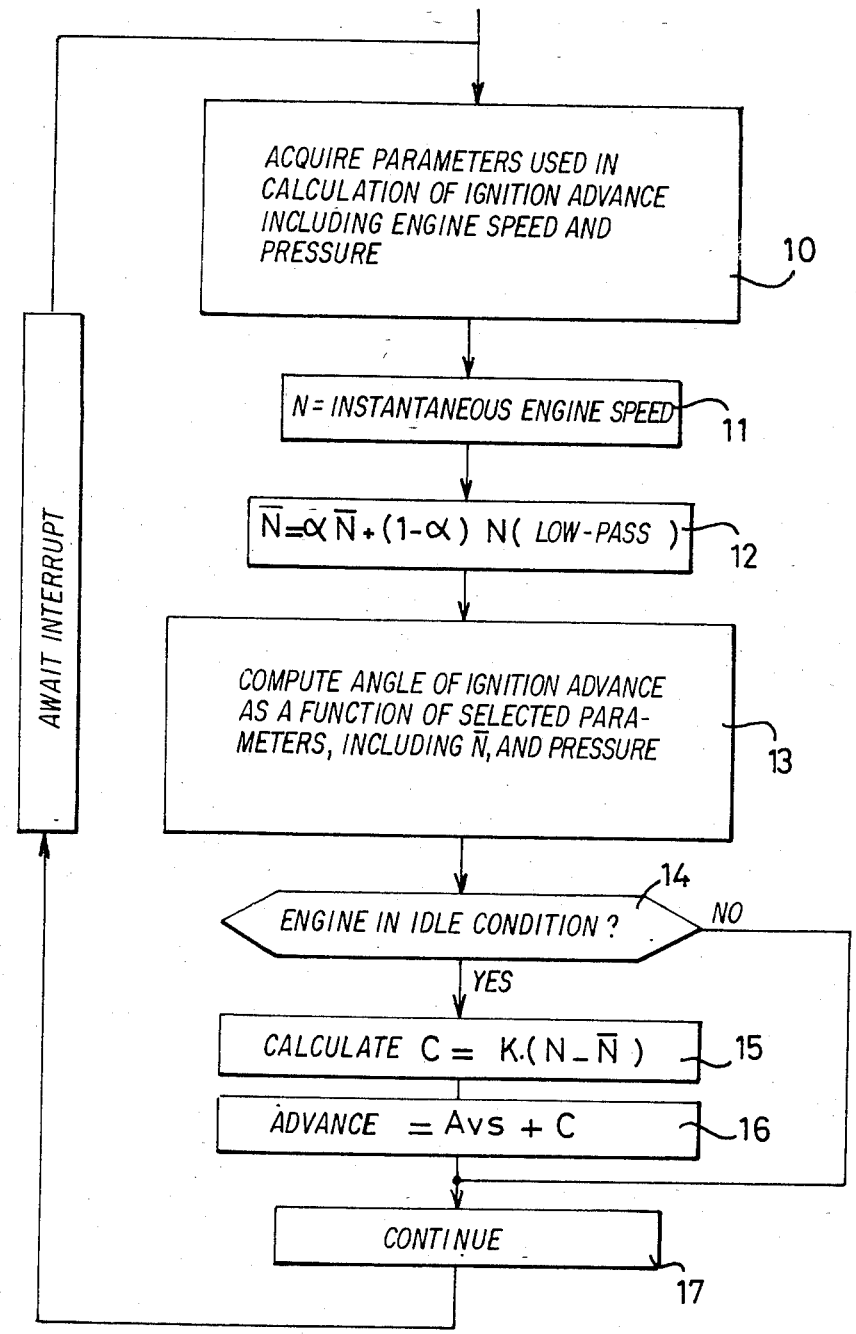
FIG. 5 is an operational flowchart of the microprocessor of FIG. 4 for the use of the process according to the invention.

The flowchart of FIG. 5 indicates the steps of the program that make it possible to use the process for stabilizing the idling speed by means of microcomputer M:

Step 10: there is made, at each detection of the synchronization signal Sy, the acquisition of the input parameters, namely pressure Pc at the intake manifold and instantaneous speed of the engine (which is computed from the synchronization signal Sy) and optionally other parameters $\phi 0$ that are able to affect the computation of the angle of ignition advance;

Step 11: N=instantaneous speed is done;

Step 12: $\overline{N}$, which represents the filtering of N through a low-pass filter, is computed; it is known that, in sampled form, the equation of a high-pass filtering is written;

$$N^*_{(n)} = \alpha N^*_{(n-1)} + \alpha[N_{(n)} - N_{(n-1)}] \quad (1)$$

in which $\alpha = e - (\Delta T/\tau)$, $\tau$ being the constant of time for filtering and $\Delta T$ the time separating two successive samplings of speed. Moreover, it is known that, in the form of Laplace transform, $N^*$ is expressed as a function of N in the following manner:

$$\alpha N^* = \frac{\tau P}{1 + \tau P} \cdot \alpha N$$

$$= \left(1 - \frac{1}{1 + \tau P}\right) \alpha N$$

$$= \alpha N - \frac{\alpha N}{1 + \tau P}$$

Now, $1/(1+\tau P)$ represents the filtering of N through a low-pass filter, i.e., $\overline{N}$. Consequently:

$$\alpha N^* = \alpha N - \alpha \overline{N}$$

and $$N^* = N - \overline{N}$$

By replacing $N^*$ in (1), there is obtained:

$$N_{(n)} - \overline{N}_{(n)} = \alpha \overline{N}_{(n-1)} + (1-\alpha)N_{(n)}$$

or:

$$\overline{N}_{(n)} = \alpha \overline{N}_{(n-1)} + (1-\alpha)N_{(n)} \quad (2)$$

$\overline{N}$ is therefore expressed as a function of N (computed in step 10), $\overline{N}$ (computed in the preceding computation cycle) and $\alpha$ which can be either a constant of predetermined value, or a function of Pc, of N, of the temperature of the cooling liquid or other parameters.

Step 13: computing by means of the standard subroutine for the angle of ignition advance as a function of speed, pressure and other optional parameters; however, preferably the filtered value $\overline{N}$ is used as speed parameter which makes it possible to be free, for the computation of the static advance, from the instantaneous variations of speed which is precisely to be compensated for; at the end of this subroutine an advance value is obtained, hereafter called static advance Avs;

Step 14: it involves a test to determine if the conditions are such that the engine can be considered as being idle operation. Preferably, this test deals with the state (closing or opening) of a operator actuated contact coupled to the gas pedal, but other parameters can be taken into account, for example the value of pressure Pc at the intake manifold compared with a threshold value:

if the response to this the test of step is NO, one goes on to step 17 "continuation of the program" which can consist, for example, in computing the conduction time of the coil;

if the response to the test of step is YES, one goes on to step 15;

step 15: computing a corrective term $C = K(N - \overline{N})$ is which represents the dynamic part of the advance whose static part Avs has been computed in step 13; K is a negative coefficient which can be either constant or variable as a function particularly of the instantaneous speed N or the filtered speed $\overline{N}$ of pressure Pc, the temperature of the cooling liquid of the engine or still other operating parameters of the engine.

step 16: computing the angle of ignition advance to be generated which is the algebraic sum of the static Avs and dynamic C parts of the advance as follows $$Av = Avs + C$$

step 17: it involves the above-mentioned sequence of the continuation of the program until the following interruption which starts a new computation cycle.

As is evident from the preceding, the dynamic advance is a direct function of $N^*$ (since $N^* = N - \overline{N}$), i.e., of the instantaneous speed filtered through a high-pass filter.

The stabilization process described exhibits, among other advantages, not necessitating the knowledge of an instruction speed and of being active as soon as there are variations of speed due, for example, to the turning on of outside elements of the vehicle such as engine fan, air conditioning device, power steering, etc. Moreover, the more active it is, the faster these variations are. For this purpose, it is possible to act on the values of $\alpha$ and of K: for example, if $\alpha$ constant is chosen, the constant of time $\tau$ will evolve as $\Delta T$, i.e., will be smaller as the speed N increases.

It will also be noted that the stabilization of speed is also active during idle deceleration by favoring engine-braking and by preventing the frequently encountered drawback of timing of the engine when the power steering is locked hard over during idle deceleration.

Figure 6:
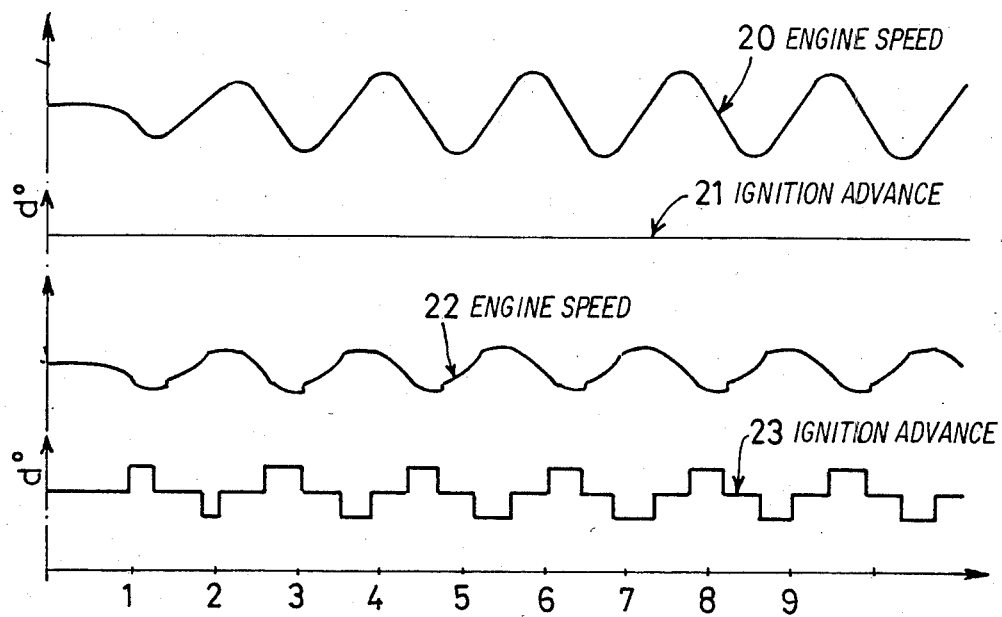
FIG. 6 is a timing diagram showing the oscillations of the idling speed of an engine with controlled ignition as a function of time, respectively without and with stabilization by modification of the ignition advance; and, FIG. 7 is a timing diagram showing the variations of the idle speed of an engine with controlled ignition in response to a sudden variation of torque, respectively without and with stabilization by modification of the ignition advance.
Figure 7:
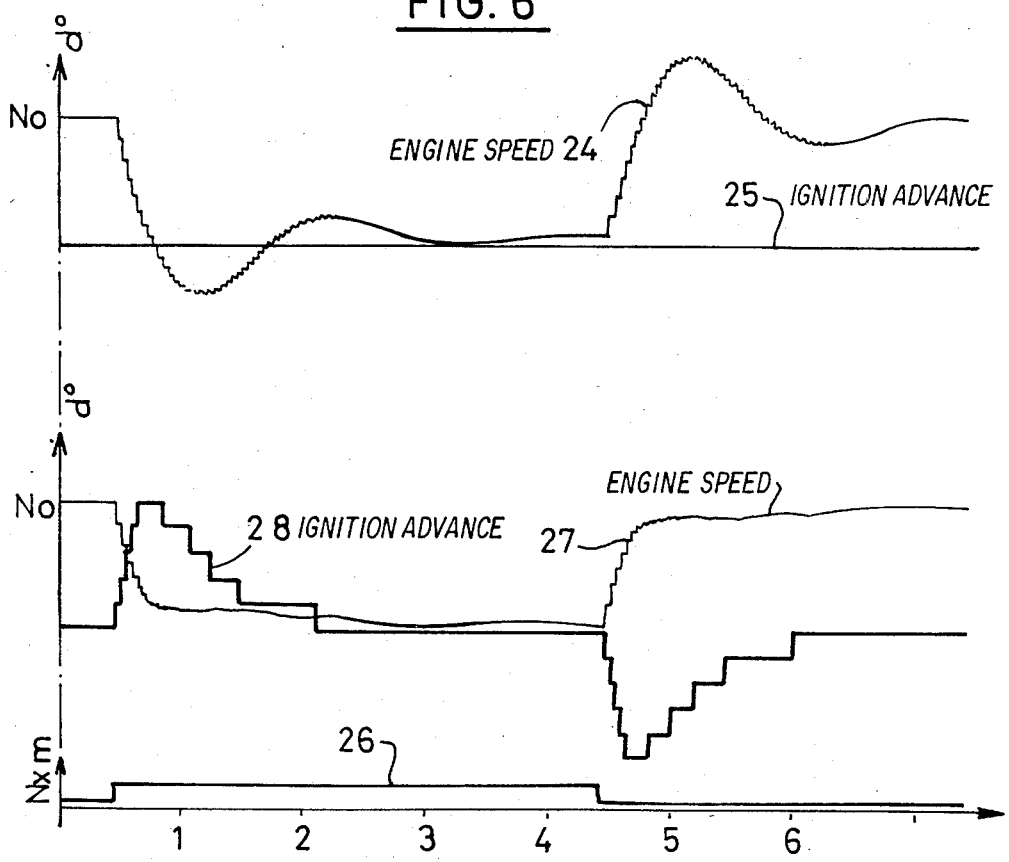

FIGS. 6 and 7 clearly show the effectiveness of the previously described stabilization process.

In FIG. 6, curve 20 represents the oscillations of the rotation speed (rpm) at idling of an engine whose ignition advance, represented by straight line 21, is constant. Curve 22 represents, under the same operating conditions of the engine, the oscillations of the idling speed that this engine exhibits when its ignition advance (curve 23) is modified according to the stabilization process according to the invention. It is found that the oscillations of curve 22 are notably more damped than those of curve 20.

In FIG. 7, curve 24 represents the evolution, in response to a sudden variation of load torque (curve 26), of the idle rotation speed, from a speed No, of an engine operating with a constant ignition advance (curve 25). Curve 27 shows the evolution of speed obtained under the same operating conditions of the engine, but while causing the angle of ignition advance (curve 28) to vary in the manner described in hereinabove. There again, the favorable influence of the stabilization by modification of the ignition advance appears very clearly.

Of course, numerous modifications can be made to the example described without going outside the scope of the invention. Thus, for example, when the operator actuated gas pedal contact is open, the advance can, in a variant, be computed as a function of the instantaneous speed N (instead of $\overline{N}$). For this purpose, the test of step 14 on the state of operator actuated gas pedal contact can be performed immediately after step 10. In case of opening (NO response), advance Av is then computed directly as a function of the instantaneous speed N and of pressure Pc, which avoids the computation of $\overline{N}$. In case of closing (YES response), there is a sequence of the steps 11, 12, 13, 15 and 16.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for stabilizing the idle speed of an internal combustion engine with controlled ignition, wherein an angle of ignition advance to be generated is determined as a function of predetermined operating parameters of the engine, including engine rotation speed and intake manifold pressure, comprising:

determining at each engine cycle if the engine is in idle condition, and if so, setting the ignition advance by measuring engine speed and producing an engine speed signal related thereto, low-pass filtering the engine speed signal, measuring the intake manifold pressure of the engine, generating a static advance signal (Avs) based on the measured intake manifold pressure and the low-pass filtered engine speed signal, high-pass filtering the measured engine speed signal to form a corrective term in the form of a dynamic advance signal, algebraically adding the static advance signal to the dynamic advance signal to produce an angle of ignition advance signal (Av), and controlling the ignition advance of the engine based on said signal Av.

2. A process according to claim 1, in which the static advance signal (Avs) is determined by a digital computation in which a filtered value $\overline{N}$ representing the low-pass filtered instantaneous speed N of the engine is computed digitally, and wherein the dynamic advance signal has a value $C=K(N-\overline{N})$, in which K is a negative coefficient.

3. A process according to claim 2, wherein:

$$\overline{N}_{(n)} = \alpha \overline{N}_{(n-1)} + (1-\alpha)N_{(n)}$$

in which:

$\overline{N}_{(n)}$ is the filtered value to be computed;

$\overline{N}_{(n-1)}$ is the filtered value computed in the previous n−1 computation cycle.

$N_{(n)}$ is the last rotation speed of the engine computed and, $\alpha$ is a coefficient with the form $e-(\Delta T/\tau)$ where:

$\Delta T$ is the time separating two successive samplings of speed N, and:

$\tau$ is the constant of filtering time.

4. A process according to claim 3, wherein at least one of the coefficients K and $\alpha$ is a constant.

5. A process according to claim 3, wherein at least one of the coefficients K and $\alpha$ is a function of at least one of the following parameters: the speed of the engine, and the coolant pressure and coolant temperature of a cooling liquid of the engine.

6. A process according to claim 2, wherein said static advance signal Avs is computed as a function of the filtered value $\overline{N}$ of the instantaneous speed and of the intake manifold pressure Pc.

7. A process according to claim 6, wherein, in case of the absence of detection of no-load operation of the engine, the generated angle of ignition advance Av is said static advance Avs computed as a function of the filtered value $\overline{N}$ of the speed and of the intake manifold pressure Pc.

8. A process as in claim 6, wherein, in case of the absence of detection of no-load operation of the engine, the generated angle of ignition advance is computed as a function of the instantaneous speed N of the engine and of the intake manifold pressure Pc.

9. A process according to claim 1 wherein it is determined if the engine is in idle operation from the state (opened-closed) of an operator actuated contact.

10. A process according to claim 1, wherein it is determined if the engine is in idle operation by comparison of the value of the intake manifold pressure (Pc) with a threshold value.

* * * * *